United States Patent [19]

Johanson

[11] Patent Number: 5,167,378
[45] Date of Patent: Dec. 1, 1992

[54] VIDEO CASSETTE REEL INSERT FOR VARYING TAPE STORAGE CAPACITY

[75] Inventor: Bradley J. Johanson, Hutchinson, Minn.

[73] Assignee: Minnesota Mining and Manufacturing Company, St. Paul, Minn.

[21] Appl. No.: 598,979

[22] Filed: Oct. 17, 1990

[51] Int. Cl.$^5$ .............................................. B65H 75/18
[52] U.S. Cl. .................................. 242/71.8; 242/68.5
[58] Field of Search ................. 242/71.8, 68.5, 74, 242/68, 68.3

[56] References Cited

U.S. PATENT DOCUMENTS

| | | | |
|---|---|---|---|
| 2,881,985 | 4/1959 | Overmire et al. | 242/71.8 |
| 3,132,822 | 5/1964 | Arthur | 242/68.5 |
| 3,395,872 | 8/1968 | Fattori | 242/71.8 |
| 3,973,740 | 8/1976 | Schankler | 242/74 X |
| 4,083,508 | 4/1978 | Pattillo | 242/68.5 |
| 4,176,804 | 12/1979 | Nemoto et al. | 242/68.5 |
| 4,511,099 | 4/1985 | Nunokawa et al. | 242/74 X |
| 4,664,328 | 5/1987 | Yamada | 242/68.5 X |
| 4,760,972 | 8/1988 | Sasaki et al. | 242/68.5 |
| 4,923,137 | 5/1990 | Jorgensen et al. | 242/68.5 |

Primary Examiner—Daniel P. Stodola
Assistant Examiner—John F. Rollins
Attorney, Agent, or Firm—Gary L. Griswold; Walter N. Kirn; Charles D. Levine

[57] ABSTRACT

A spacer ring for reducing the available volume of tape storage on a tape reel. The spacer ring includes a cylindrical annular body which fits around the reel hub. The spacer ring is mounted on the tape reel so as to prevent relative rotation of the spacer ring and the tape reel. The spacer ring mounted on the tape reel can be handled as a single unit by assembly equipment used to assemble tape cassettes. Mounting can be performed with a tab which frictionally fits within a complementarily-shaped opening formed within the tape reel hub. The tape is secured to the spacer ring with an opening formed within the outer surface of the cylindrical body which mates with a complementarily-shaped clip. The spacer ring height at its outer surface is larger than that at its inner surface to eliminate gaps between the spacer ring and reel flanges.

The spacer ring height at its outer surface is larger than that at its inner surface to eliminate gaps between the spacer ring and reel flanges.

11 Claims, 3 Drawing Sheets

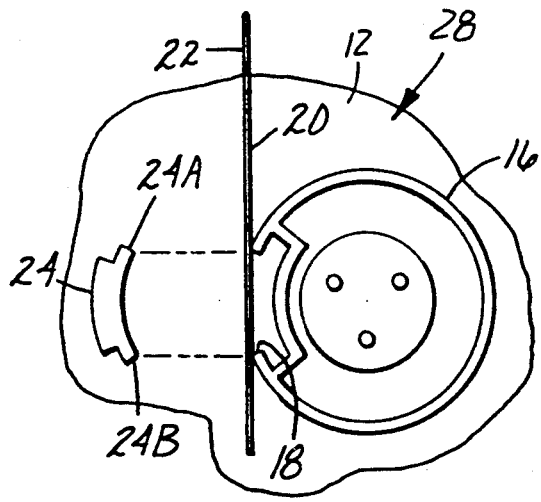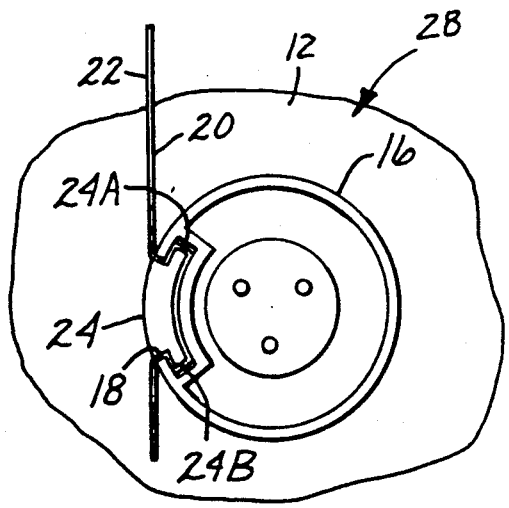
Fig. 2A  Fig. 2B
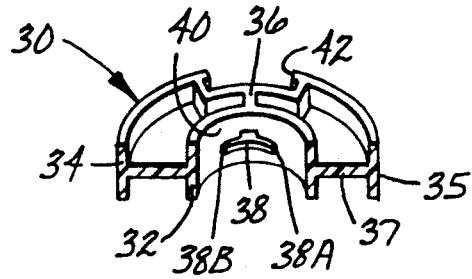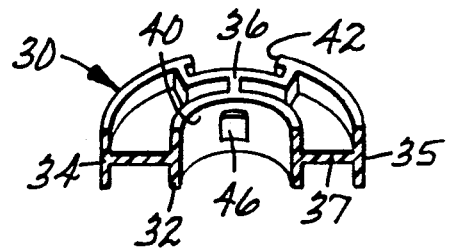
Fig. 3A  Fig. 3B
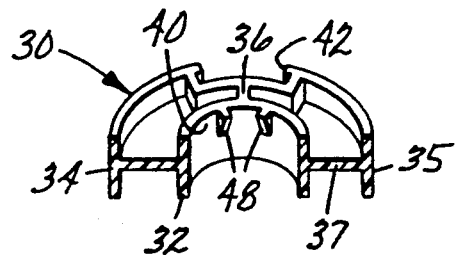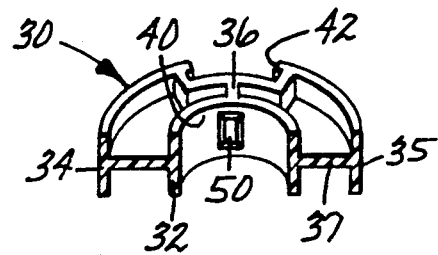
Fig. 3C  Fig. 3D
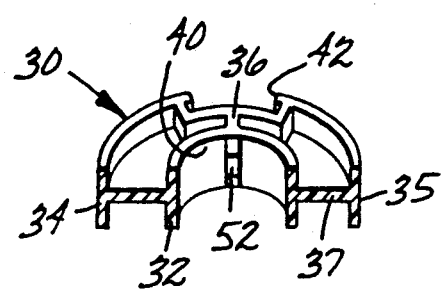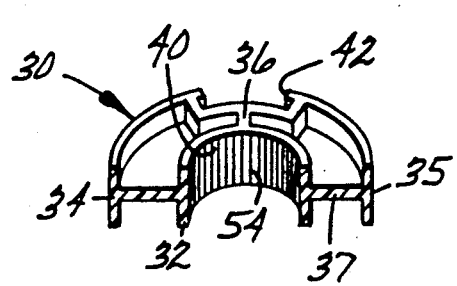
Fig. 3E  Fig. 3F

VIDEO CASSETTE REEL INSERT FOR VARYING TAPE STORAGE CAPACITY

TECHNICAL FIELD

The present invention relates to magnetic tape cassette reels. More particularly, the present invention relates to modular magnetic tape cassette reels using inserts to vary the tape storage capability.

BACKGROUND OF THE INVENTION

When winding magnetic recording tape onto a reel in a tape cassette it is desirable that the hub have the largest possible diameter, within the constraints of tape length and overall package size. This reduces the amount of tape damage due to flexing or stretching, reduces the tension on the tape caused by smaller winding diameters, and reduces the number of reel rotations necessary to wind or unwind a length of tape.

In video cassettes the maximum length of tape which can be wound onto the reel is determined and limited by the size of the cassette, which must be a standard size to function in standard video tape machines. However, in many cases, less than the maximum amount of tape is needed. In these cases, it is desirable to provide the same diameter reels with a larger hub diameter to achieve the above results. This is the case with video cassettes as well as with other types of tape recording media, such as audio cassettes and data cassettes.

However, providing more than one hub diameter presents significant manufacturing problems, since video cassettes are produced in large volumes, using high speed multicavity injection molding equipment and automated assembly equipment. Many of the advantages inherent in using such equipment are lost if even occasional shutdowns are needed to accommodate changes in the product being produced. Additionally, producing larger-than-standard hub diameters presents other problems, including increased tooling costs. As molds for making complete hubs are complex and expensive, since many hub sizes may be required in relatively small and unpredictable quantities, tooling costs can become prohibitive.

A further problem in producing a series of tape reels which differ only in hub diameter, is the confusion which can arise without a suitable method for quickly identifying the various hub sizes. One common part identification method is color coding. However, it is often not convenient, economical, or even possible, to provide the desired color and materials having the mechanical and molding properties for making complete hubs.

One well known method of accommodating product variety while still retaining the advantages of high volume production equipment is modular product design. Tape reels having a larger than standard hub diameter can be made by providing a circular insert which fits over the standard, presumably smallest, hub.

U.S. Pat. No. 4,083,508 discloses a circular insert for reducing the tape capacity of a reel used in data recording. However, this insert does not lend itself to automated assembly, as sonic welding must be used to attach the insert to the reel flange. Sonic welding is time consuming, requires special equipment and proper part design, and may not be applicable to all materials that might otherwise be suitable for use. Additionally, this insert lacks any system to secure the tape to the reel.

In U.S. Pat. No. 4,760,972, a two-part reel construction is disclosed. In this reel, the two parts are concentric circular components. The two-part construction yields a more precisely shaped hub which reduces misalignment and subsequent damage to the tape. However, this hub design requires that additional parts be used in every reel, not just those requiring larger hub diameters. This does not allow a choice of hub diameters in automatically assembled tape cassettes.

U.S. Pat. No. 4,176,804 is directed to a reel construction in which the hub is formed of two separate semicircular halves which can be separate from the reel flanges. This reel does not increase the choice of hub diameters, but rather provides a flexible core which does not stretch the tape when a large mount of tape is tightly wound onto the reel. Also, the two-part construction of this insert adds unnecessarily to the complexity of any automated assembly.

None of the known hub designs provides a reel insert for use with otherwise complete tape reels which permits tape reels having a number of different possible hub diameters to be made using the same automated assembly equipment, with a minimum of changeover, downtime, and startup time required to change from one hub diameter to another. None of these designs produces reel hubs with a plurality of different diameters such that the hub which is produced in the largest volumes has the fewest parts.

SUMMARY OF THE INVENTION

A spacer ring according to the present invention overcomes these deficiencies. When placed on the hub of a tape reel, between the upper and lower flanges, the spacer ring reduces the playing time of a tape cassette by reducing the available volume for storage of tape on the tape reel. The spacer ring has a cylindrical annular body with a cylindrical inner surface and a cylindrical outer surface. The inner surface radius is substantially equal to the radius of the hub and the outer radius is selected to determine the desired length of tape to be stored on the tape reel. Preferably, the cylindrical annular body is formed of a cylindrical inner ring on which the inner surface is formed and a cylindrical outer ring on which the outer surface is formed. A plurality of radial spacer bars connect the inner ring and the outer ring. The height of the spacer ring can be substantially equal to the height of the reel hub and can be constant or can be larger at its outer surface than the height at its inner surface.

A mounting device mounts the spacer ring on the tape reel and prevents relative rotation of the spacer ring and the tape reel. This allows the spacer ring mounted on the tape reel to be handled as a single unit by assembly equipment used to assemble tape cassettes. The mounting device can include a tab mounted on the inner surface of the cylindrical body which frictionally fits within a complementarily-shaped opening formed within the tape reel hub. Alternatively, the mounting device can include at least one tab mounted on the inner surface of the cylindrical body which is press fit against the tape reel hub.

A securing device secures the end of the tape to the spacer ring. The securing device includes an opening formed within the outer surface of the cylindrical body which mates with a complementarily-shaped clip. The clip frictionally fits within the opening to secure the end of the tape within the opening.

BRIEF DESCRIPTION OF THE DRAWINGS

FIGS. 2A and 2B are top views of a tape reel hub showing the method of attaching the tape leader to the reel hub in VHS video tape cassettes.

FIGS. 3A-3F are perspective views, partially in cross section, showing alternative configurations of the spacer ring.

DETAILED DESCRIPTION OF PREFERRED EMBODIMENTS

The present invention involves increasing the reel hub diameter of magnetic tape cassettes to adapt the cassettes for shorter-than-standard tape lengths. The present invention can be used with video, audio, data storage, and other types of magnetic tape recording media. Additionally, although the description focuses on producing shorter play recording reels such as those in T-60 video cassettes by increasing the hub diameter of longer playing T-120 cassette reels, the present invention can also be applied to other tape lengths. The increased hub diameter is achieved by placing a spacer ring on a tape reel hub.

Figure 1:
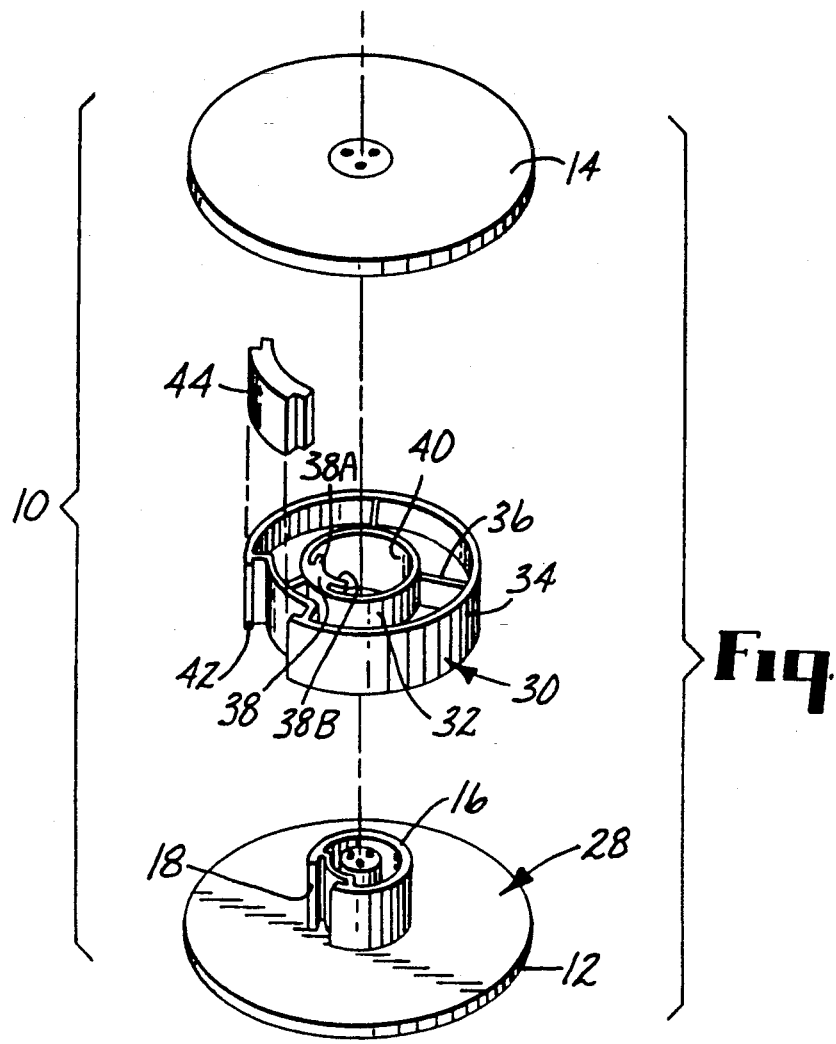
FIG. 1 is an exploded view of a video cassette tape reel showing the spacer ring according to the present invention.
Figure 4:
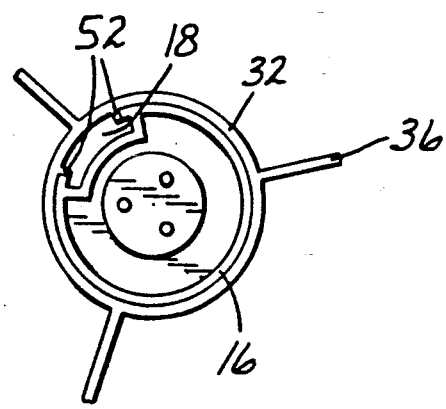
FIG. 4 is a top view of the spacer ring illustrating how the ribs on the spacer ring fit into the clip opening on the hub.

Referring to FIG. 1, the reel 10 includes a circular lower flange 12, a circular upper flange 14, and a cylindrical hub 16. The hub 16 and lower flange 12 are preferably formed as one piece, a lower reel portion 28, with the upper flange 14 being a separate member. The hub 16 is formed with a clip opening 18. As discussed below and referring to FIG. 2, the clip opening 18 receives the tape leader 20, which is attached to each end of the tape 22, to attach the tape 22 to the reel 10. This is accomplished using the clip 24, also known as a clamp. In the present invention, the clip opening 18 serves to mount the spacer ring 30 on the hub 16.

The spacer ring 30, in the illustrated embodiments, is formed of concentric cylindrical rings, inner ring 32 and outer ring 34. The two rings 32, 34 are connected together by a central planar rib 37 best shown in FIGS. 3 and 5, and a plurality of radial spacer bars 36 formed on the planar rib 37. Three spacer bars 36 are shown although more or fewer spacer bars may be provided. A tab 38 is formed on the inner surface 40 of the inner ring 32. This tab 38 has a shape complementary to that of the clip opening 18 on the reel hub 16, and as shown in FIG. 1, extends for the entire axial length of the spacer ring 30. Thus, the spacer ring 30 is mounted on the hub 16 by sliding the spacer ring 30 over the hub so that the tab 38 mates with the clip opening 18. The interaction between the tab 38 and clip opening 18 prevents relative rotation between the spacer ring 30 and the reel 10 and allows the combined assembly of the hub 16 and lower reel flange 14 and the spacer ring 30 to be handled as a single unit by automatic equipment used to assemble the reels 10. The combination of the hub 16 and spacer ring 30 form a reel 10 having a winding surface equal to the circumference of the spacer ring 30 rather than the circumference of the hub 16.

In current VHS video tape cassettes, the magnetic recording tape 22 is attached to the hub 16 as shown in FIG. 2. Attachment of the tape leader 20 to the hub 16 is performed by laying the leader 20 over the clip opening 18, as shown in FIG. 2A, and snapping the clip 24 into the clip opening 18, as shown in FIG. 2B. This tightly pinches the leader 20 at points 24A and 24B. The radius of the outer curved surface 26 of the clip 24 is equal to the radius of the outer curved surface of the hub 16. Thus, when the clip 24 is assembled within the hub 16, the clip 24 and hub 16 form a continuous cylindrical outer winding surface of constant radius.

Figure 5:
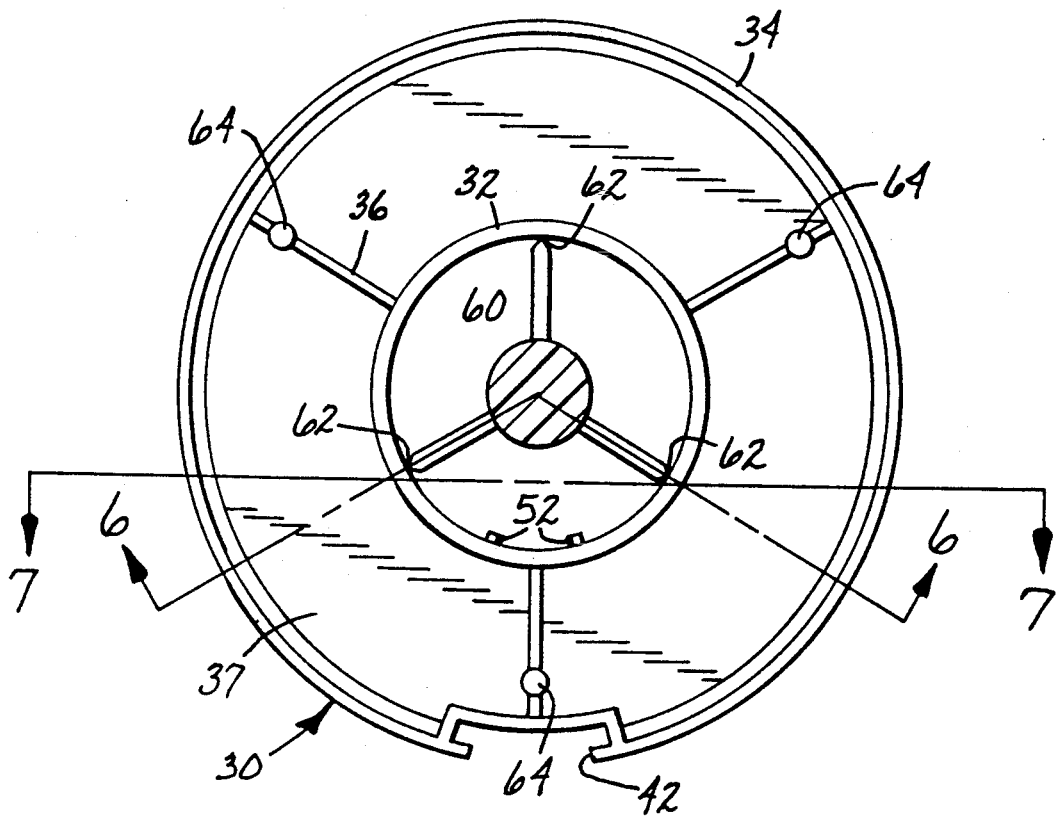
FIG. 5 is a top view of the spacer ring of FIG. 1.

Attaching the tape leader 20 to the spacer ring 30 is accomplished in essentially the same manner. As shown in FIGS. 1, 3, and 5, a clip opening 42 is formed in the outer ring 32 of the spacer ring 30. Although in the illustrated embodiments, the clip opening 42 is shown substantially in line with the tab 38, the clip opening 42 can be located on the outer ring 32 of the spacer ring 30 anywhere with respect to the tab 38. This clip opening 42 is similar to clip opening 18 formed in the hub 16 of the reel 10. After the leader is laid over the clip opening 42, a clip 44 snaps into the clip opening 42 to tightly pinch the leader 20. Since the circumference of the spacer ring 30 is larger than the circumference of the hub 16, the radius of the outer curved surface of a clip 44, must be correspondingly larger than that of the outer curved surface of clip 24 to form a continuous cylindrical winding surface 35 of constant radius. The dimensional accuracy of this winding surface 35 is critical in providing satisfactory winding and unwinding of the tape.

Because the combination of the spacer ring 30 and the hub 16 must be handled as a single unit by the assembly equipment used to manufacture the reels 10, it is essential that the spacer ring 30 form a tight fit over the hub 16. This can be accomplished by dimensioning the spacer ring 30 to form a press fit relative to the hub 16, provided that the press fit is made without scraping or otherwise damaging the parts in any way which might cause debris to be left on the assembled reel 10, since any debris is likely to find its way onto the tape 22, and into the tape playing equipment. It is also important that mounting the spacer ring 30 to the hub 16 does not cause significant deformation, which could lead to eccentricity or other adverse effects upon tape winding and running. Several configurations have been found which meet these requirements. In particular, by designing tab 38 to have a configuration similar to clip 24, as shown in FIG. 1, the requisite tightness of fit, along with the necessary concentricity, can be achieved.

However, the tab 38 need not extend all the way across the spacer ring 30 to be effective. FIG. 3A shows one configuration in which the tab 38 extends only a small axial distance across the spacer ring 30. This uses less material and is less likely to cause eccentricity in the spacer ring 30 when the spacer ring 30 is formed by injection molding of a thermoplastic.

Further simplification can be achieved by realizing that the requirements placed on the tab 38 differ significantly from those placed upon clip 24, because the tab 38 is a part of the spacer ring 30. If the spacer ring 30 fits closely over the hub 16, projections 38A and 38B need not be formed on the tab 38 to prevent radial movement. Consequently, several simpler tab configurations are possible. In FIG. 3B, the tab is a rectangular tab 46 having circumferential width sufficient to press fit within the clip opening 18 when the spacer ring 30 is slid onto the hub 16. In FIG. 3C, the tab includes two thinner projections 48, each of which presses against the interior of the clip opening 18. In FIG. 3D, a tab 50 is chamfered to align the spacer ring 30 to the hub 16 during assembly. Chamfering also reduces the area of contact between the spacer ring 30 and the hub 16, thereby allowing these two parts to lock without a high level of interference or deformation, and without scraping which might leave debris on the reel 10.

Figure 6:
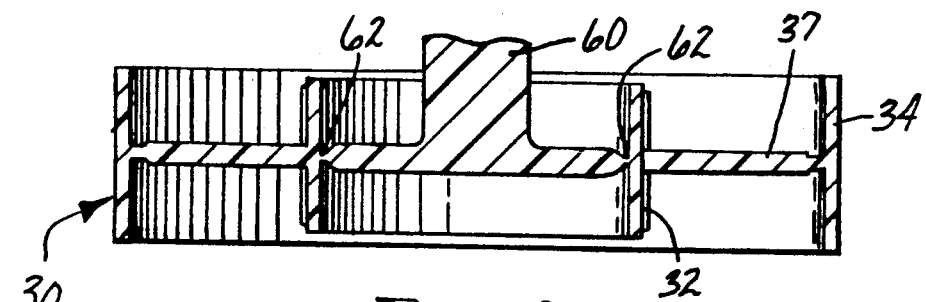
FIG. 6 is a cross-sectional view of the spacer ring of FIG. 5 taken along line 6—6.
Figure 7:
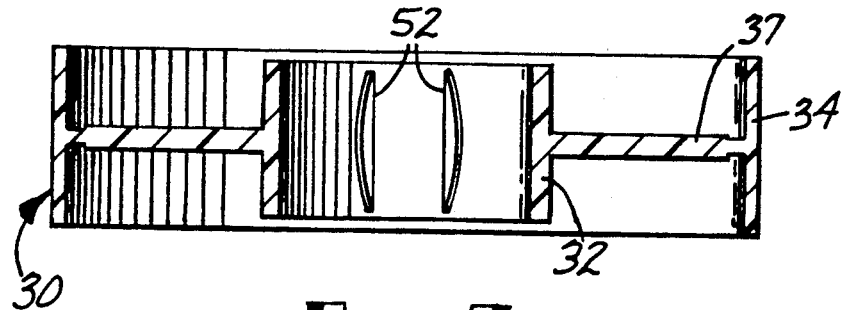
FIG. 7 is a cross-sectional view of the spacer ring of FIG. 5 taken along line 7—7.

In FIGS. 4, 5, 6, and 7, a pair of narrow tabs 52 are formed on the inner surface 40 of the inner ring 32. As shown, these tabs are received in the clip opening 18. As shown in FIG. 7, the tabs 52 are tapered on each end to aid in insertion, and can have a flat area in the middle for contacting the hub opening after insertion. This uses a minimum amount of material, while minimizing the irregular shrink, or sinking, which can occur in areas near molded-in tabs which are too large. This also minimizes any eccentricity which might occur in the spacer ring 30 due to the incorporation of massive non-symmetrical tabs.

Where the tab 38, 46, 48, 50 does not extend over the full axial width of the spacer ring 30, there are several possible positions which the tab can occupy relative to the edge of the spacer ring 30. As shown in FIGS. 3A, 3B, and 3D, a position midway between the edges is satisfactory. In FIG. 3C, the tab 48 is located adjacent the upper edge of the spacer ring 30. In some cases, assembly may be facilitated by locating the tab such that part of the spacer ring 30 is slid onto hub 16 before the tab engages the hub.

Nor must the clip opening 18 be used for locking the spacer ring 30 onto hub 16. One or more other, narrower slots could be provided in the hub 16, which would be engaged by a narrow tab 52 of the type shown in FIG. 3E. Still another alternative includes equipping the spacer ring 30 with a series of splines 54, as shown in FIG. 3F, which are press fit against the hub 16 without using the clip opening 18 or providing any additional slots in the hub 16.

The spacer ring 30 should be dimensioned to fill the axial space between flanges 12 and 14 to eliminate any gaps between the spacer ring 30 and respective flanges 12, 14 into which the tape 22 might drift. The tape 22 could become caught in such a gap and be deformed. In principle, the height of the spacer ring 30 should be equal to the height of the hub 16, so that the distance between the lower flange 12 and the upper flange 14 will be the same as in a standard reel. In practice, since the hub 16 and flanges 12, 14 deflect, the height of the spacer ring 30 at its outside diameter should be slightly larger than the height at its inside diameter, to eliminate any gap between the spacer ring 30 and the flanges 12, 14. This is shown in FIGS. 6 and 7. A spacer ring 30 which converts a T-120 reel to a T-60 reel, should have an outside diameter height about 0.25 mm (0.010 inch) larger than the inside diameter height.

The molding of the spacer ring 30 is a separate operation from the molding of the lower flange 12 and hub 16. Thus, all reels, regardless of the final hub size, can use the same lower reel portion 28. This eliminates the need for changeover in the reel portion 28 molding operation, and confines the variable part of the operation, the selection of hub diameter, to a single assembly stage, where the spacer ring 30 is inserted onto the reel portion 28. This assembly operation is much more flexible than standard molding operations and can completely eliminate the need for specifically designed and molded T-60 and other shorter play hub molds. Additionally, the spacer ring 30 is a simpler part to produce than the lower reel portion 28. Moreover, since no single size spacer ring 30 will be required in the quantities in which the lower reel portion 28 is produced, molding of the spacer ring 30 will likely require less expensive tooling and less press capacity. This increases the possible manufacturing sources for various versions of the spacer ring 30.

Despite its simplicity, however, the spacer ring 30 places critical dimensional requirements on the molder. The outer curved winding surface 35 of the spacer ring 30 must be concentric to the center of rotation of the hub 16, and must be substantially perpendicular to its radius of curvature at all points. That is, the outer surface of the spacer ring 30 must closely approximate a cylinder which, when fitted onto the hub 16, is concentric and coaxial with the axis of rotation of the hub 16.

Thermoplastic injection molding can be used to produce the spacer ring 30. Symmetry in injecting the molding material into the mold 60, shown in part in FIG. 5, is important in designing injection molds for producing spacer rings 30. Spacer ring symmetry is accomplished by injecting molding material at the inner curved surface of the spacer ring 30 in a plane passing through the middle of the spacer 30 through three gates 62 located 120° apart and 60° from adjacent radial spacer bars 36. The planar rib 37 which connects the inner and outer rings 32, 34, helps improve the concentricity, as well as the strength, of the spacer ring 30. The planar rib 37 also provides an attachment point for an automatic part remover (not shown) which extracts the spacer ring 30 from the mold.

The mold parting line on the winding surface 35 of the spacer ring 30 should not pass through the winding surface of the spacer ring 30 since the winding surface 35 must be very smooth, with no flash or other defects. Thus, the parting line for the winding surface portion of the mold must be offset to the axial edge of the winding surface 35. Further, since the winding surface 35 must be substantially circular with no taper, the winding surface portion of the mold should have a zero draft angle. It has been found that the mold can be designed such that shrinkage of the molding material is sufficient to allow the part to be ejected from the mold without a draft angle on the winding surface 35. It has also been found that a suitable location 64 for the ejector pins of the mold 60 is near the winding surface 35, contacting the radial spacer bars 36, as shown in FIG. 5. The symmetrical location of these ejector pins around the circumference of the spacer ring 30 helps to eject the spacer without damage.

Materials suitable for the spacer ring 30 include polymers commonly used in video cassette parts, such as polyacetal, polypropylene, polystyrene, and ABS. The spacer ring 30 may not be required to meet certain requirements which must be met by the lower reel portion 28, such as low friction, resistance to abrasion, and moldability in large, complex molds as the spacer ring 30 is not subject to all of the same conditions during manufacture and assembly of the lower reel portion 28. Therefore, it may be possible to reduce the cost of the reel assembly by using less expensive material for the spacer ring 30 without degrading the performance of the assembled reel 10.

With the present invention, a 60 minute T-60 tape can be provided from what begins as a 120 minute T-120 cassette. Typical dimensions for a spacer ring 30 which is suitable for converting a T-120 reel to a T-60 reel are as follows. The thickness of the inner ring 32 and the clip opening 42 is 1.0 mm (0.040 inch); the outer ring 34 thickness is 1.4 mm (0.055 inch); the spacer bar 36 thickness is 0.76 mm (0.030 inch); the diameter of the inner ring 32 is 26.1 mm (1.030 inch); and the diameter of the outer ring 34 is 61.85 mm (2.435 inch).

Numerous characteristics, advantages, and embodiments of the invention have been described in detail in the foregoing description with reference to the accompanying drawings. However, the disclosure is illustrative only and the invention is not intended to be limited to the precise embodiments illustrated. Various changes and modifications may be effected therein by one skilled in the art without departing from the scope or spirit of the invention.

I claim:

1. A spacer ring for reducing the available storage volume of tape on a tape reel of a tape cassette, wherein the tape reel has upper and lower flanges and a cylindrical hub intermediate the flanges, the spacer ring comprising:
    a cylindrical annular body having a cylindrical inner surface and a cylindrical outer surface, wherein the inner surface radius is substantially equal to the radius of the hub and the outer radius is selected in combination with the desired length of tape to be stored on the tape reel;
    means for mounting the spacer ring on the tape reel and for preventing relative rotation of the spacer ring and the tape reel to allow the spacer ring mounted on the tape reel to be handled as a single unit by assembly equipment used to assemble tape cassettes; and
    means for securing the end of the tape to the spacer ring;
    wherein the height of the spacer ring at its inner surface is substantially equal to the height of the reel hub and the height of the spacer ring at its outer surface is larger than the height at its inner surface.

2. The spacer ring of claim 1 wherein the mounting means comprises a tab mounted on the inner surface of the cylindrical annular body which frictionally fits within a complementarily-shaped opening formed within the tape reel hub.

3. The spacer ring of claim 1 wherein the mounting means comprises at least one tab mounted on the inner surface of the cylindrical annular body which is press fit against the tape reel hub.

4. The spacer ring of claim 1 wherein the securing means comprises:
    an opening formed within the outer surface of the cylindrical annular body; and
    a complementarily-shaped clip which frictionally fits within the opening to secure the end of the tape within the opening.

5. The spacer ring of claim 1 wherein the cylindrical annular body comprises a cylindrical inner ring on which the inner surface is formed and a cylindrical outer ring on which the outer surface is formed.

6. The spacer ring of claim 5 wherein the cylindrical annular body further comprises a plurality of radial spacer bars connecting the inner ring and the outer ring.

7. A spacer ring for reducing the playing time of a tape reel of a tape cassette by reducing the available storage volume of tape on the tape reel, wherein the tape reel has upper and lower flanges and a cylindrical hub intermediate the flanges, the spacer ring comprising:
    a cylindrical annular body comprising a cylindrical inner ring having an inner surface, a cylindrical outer ring having an outer surface, and a plurality of radial spacer bars connecting the inner ring and the outer ring, wherein the inner surface radius is substantially equal to the radius of the hub and the outer radius is selected to determine a desired length of tape to be stored on the tape reel, and wherein the height of the spacer ring at its inner surface is substantially equal to the height of the reel hub, and the height of the spacer ring at its outer surface is larger than the height at its inner surface;
    means or mounting the spacer ring on the tape reel and for preventing relative rotation of the spacer ring and the tape reel to allow the spacer ring mounted on the tape reel to be handled as a single unit by assembly equipment used to assemble tape cassettes, wherein the mounting means comprises a tab mounted on the inner surface of the cylindrical annular body which frictionally fits within a complementarily-shaped opening formed within the tape reel hub; and
    means for securing the end of the tape to the spacer ring, wherein the securing means comprises an opening formed within the outer surface of the cylindrical annular body, and a complementarily-shaped clip which frictionally fits within the opening to secure the end of the tape within the opening.

8. A tape reel for use in a tape cassette along with a length of tape, wherein the tape reel comprises:
    an upper flange;
    a lower flange;
    a cylindrical hub intermediate the flanges; and
    a spacer ring mounted on the hub for reducing the available volume for storage of tape on the tape reel, the spacer ring comprising:
    a cylindrical annular body having a cylindrical inner surface and a cylindrical outer surface, wherein the inner surface radius is substantially equal to the radius of the hub and the outer radius is selected in combination with the desired length of tape to be stored on the tape reel, and wherein the height of the spacer ring at its inner surface is substantially equal to the height of the reel hub, and the height of the spacer ring at its outer surface is larger than the height at its inner surface;
    means for mounting the spacer ring on the tape reel and for preventing relative rotation of the spacer ring and the tape reel to allow the spacer ring mounted on the tape reel to be handled as a single unit by assembly equipment used to assemble tape cassettes; and
    means for securing the end of the tape to the spacer ring.

9. The tape reel of claim 8 wherein the mounting means comprises a tab mounted on the inner surface of the cylindrical annular body which frictionally fits within a complementarily-shaped opening formed within the tape reel hub, and the securing means comprises an opening formed within the outer surface of the cylindrical annular body, and a complementarily-shaped clip which frictionally fits within the opening to secure the end of the tape within the opening.

10. The tape reel of claim 8 wherein the cylindrical annular body comprises a cylindrical inner ring on which the inner surface is formed, a cylindrical outer ring on which the outer surface is formed, and a plurality of radial spacer bars connecting the inner ring and the outer ring.

11. A tape cassette including at least one tape reel and a length of tape, wherein the tape reel comprises:
    an upper flange;
    a lower flange;
    a cylindrical hub intermediate the flanges; and
    a spacer ring mounted on the hub for reducing the available volume for storage of tape on the tape reel, the spacer ring comprising:
        a cylindrical annular body having a cylindrical inner surface and a cylindrical outer surface, wherein the inner surface radius is substantially equal to the radius of the hub and the outer radius is selected in combination with the desired length of tape to be stored on the tape reel, and wherein the height of the spacer ring at its inner surface is substantially equal to the height of the reel hub, and the height of the spacer ring at its outer surface is larger than the height at its inner surface;
    means for mounting the spacer ring on the tape reel and for preventing relative rotation of the spacer ring and the tape reel to allow the spacer ring mounted on the tape reel to be handled as a single unit by assembly equipment used to assemble tape cassettes; and
    means for securing the end of the tape to the spacer ring.

* * * * *

UNITED STATES PATENT AND TRADEMARK OFFICE
CERTIFICATE OF CORRECTION

PATENT NO. : 5,167,378
DATED : December 1, 1992
INVENTOR(S) : Bradley J. Johanson It is certified that error appears in the above-identified patent and that said Letters Patent is hereby corrected as shown below:

Column 8, line 20, "or" should read --for--.

Signed and Sealed this

Twentieth Day of September, 1994

Attest:

BRUCE LEHMAN

Attesting Officer    Commissioner of Patents and Trademarks